United States Patent [19]

Shaffer

[11] Patent Number: 4,821,958

[45] Date of Patent: Apr. 18, 1989

[54] MOBILE PRESSURE CLEANING UNIT

[75] Inventor: Detmer B. Shaffer, Garrettsville, Ohio

[73] Assignee: Sparkle Wash, Inc., Bedford Heights, Ohio

[21] Appl. No.: 92,617

[22] Filed: Sep. 3, 1987

[51] Int. Cl.⁴ .......................... B05B 1/24; E01H 3/02
[52] U.S. Cl. ..................................... 239/131; 239/172; 239/305; 239/307; 137/112; 137/351; 137/607; 137/624.18
[58] Field of Search ............... 239/130, 131, 172, 304, 239/307, 305, 312; 200/81.9 R, 82 R; 137/624.18, 112, 604, 607, 351, 624.2

[56] References Cited

U.S. PATENT DOCUMENTS

| | | | |
|---|---|---|---|
| 2,044,557 | 6/1936 | Alvord | 239/131 |
| 2,987,259 | 6/1961 | Lindquist | 239/130 |
| 3,226,030 | 12/1965 | Rossi | 239/305 |
| 3,380,658 | 4/1968 | Stasz et al. | 239/130 |
| 3,383,044 | 5/1968 | Norstrud et al. | 239/305 |
| 3,481,544 | 12/1969 | Jackson | 239/130 |
| 3,491,948 | 1/1970 | Alexander | 239/304 |
| 3,567,342 | 3/1971 | Jackson | 417/410 |
| 4,213,796 | 7/1980 | Shaffer | 137/112 |
| 4,289,276 | 9/1981 | Bollina et al. | 239/312 |
| 4,290,442 | 9/1981 | Shaffer | 137/112 |

Primary Examiner—Andres Kashnikow
Assistant Examiner—Christopher G. Trainor
Attorney, Agent, or Firm—Pearne, Gordon, McCoy & Granger

[57] ABSTRACT

A mobile cleaning unit for providing high pressure cleaning and rinsing sprays, comprising a van-type vehicle with separate sources of water and cleaning and treating solutions. The sprays may be heated by a self-contained water heater with a fuel ignitor operated by low voltage direct current. The separate solutions are selected by a pressure switch sensitive to an increase in spray line pressure caused by stopping the spray by operation of a valve at the spray applicator. The pressure switch acts to sequentially open a supply valve for each solution in turn.

18 Claims, 3 Drawing Sheets

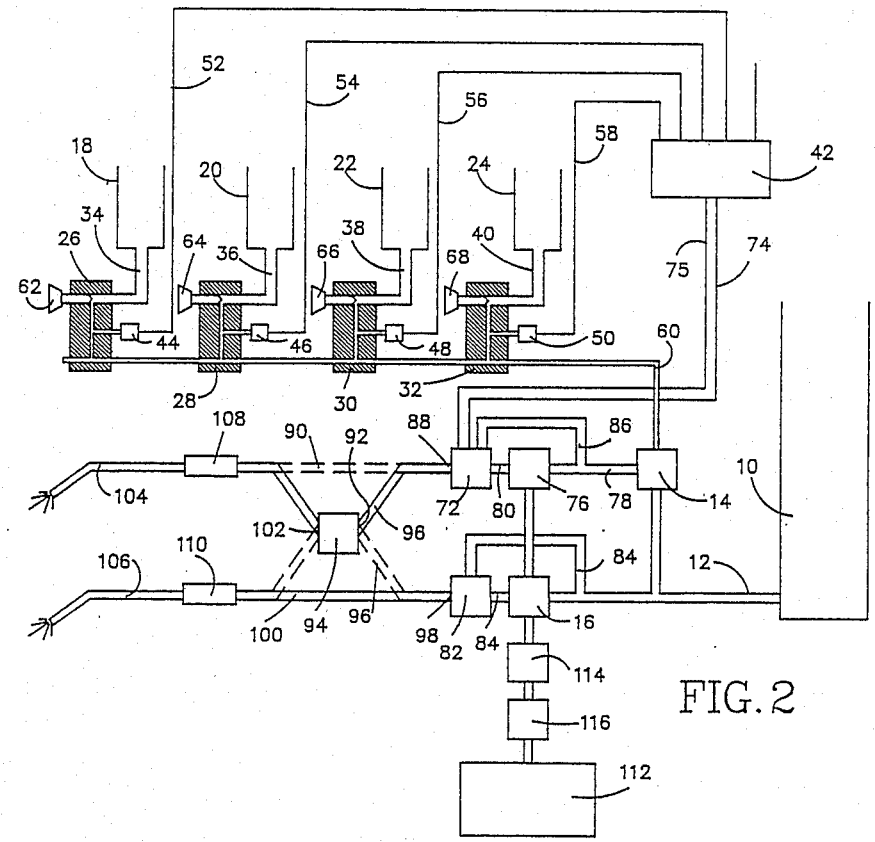
FIG. 2
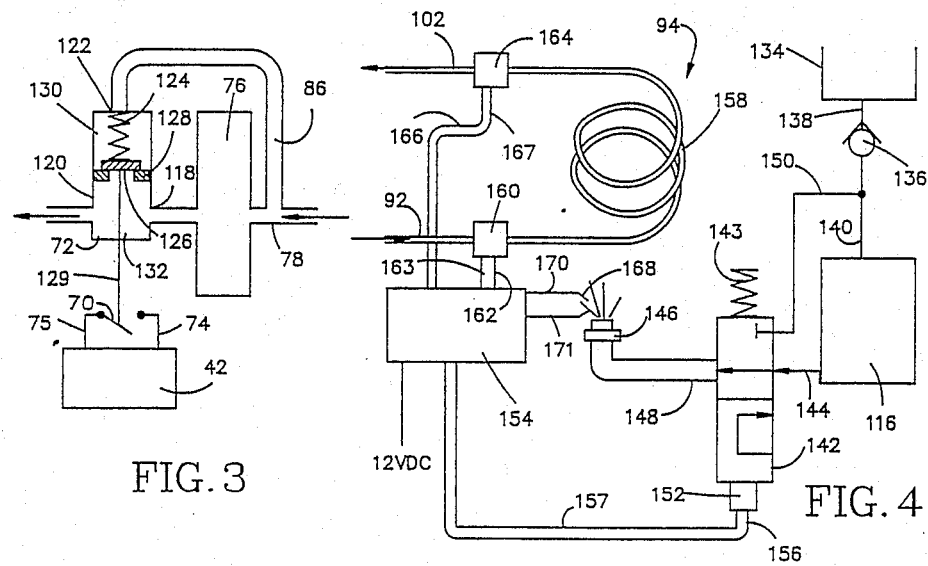
FIG. 3
FIG. 4

MOBILE PRESSURE CLEANING UNIT

BACKGROUND OF THE INVENTION

This invention relates to a mobile or stationary cleaning and treating unit, and more particularly to an apparatus for high pressure spray application in the cleaning and treating of large structures, such as mobile homes, trucks, automobiles, buildings, and the like. Through a novel control system and a self-contained heating system, different cleaning and treating sprays may be employed.

Mobile units for on-site cleaning and treating operations are shown in U.S. Pat. Nos. 3,567,342; 4,213,796; and 4,290,442, which are herein incorporated by reference. The units described therein are compact and self-contained, each carrying its own water (optional), cleaning and treating compounds, and the like, as well as power generating equipment to produce a high pressure spray.

Cleaning with units of the type of this invention is more efficient than those using low water pressure. In particular, the use of high pressure positive displacement pumps and correct proportions of various treating agents with water provides better and more efficient cleaning. A relatively compact mobile van may house and carry the washing equipment, which is fixed within the van except for one or more spray hoses with remote applicators and control valves.

The pumps that provide the high pressure spray in the cited prior art patents are driven by electricity from generators driven by a power unit in the truck. Water in an internal storage tank is maintained at its initial temperature (not heated to a higher temperature) through the use of an electric heating element. Unloader valves are provided with the positive displacement pumps to permit operation of the pumps while the spray outlet is turned off. Provision has been made for mixing various liquid cleaners with water drawn from the storage tank carried by the truck and supplied to the hose and applicator by the pumps.

In the units disclosed in the latter two aforementioned patents, an improvement was incorporated comprising selection from a series of cleaners to be added to the water by sensing the change in fluid flow caused by opening and closing a flow valve on the applicator. Tanks were provided for the different cleaning additives and a selector valve assembly selected the desired additive. Operation of the selector valve was triggered by a change in the fluid flow through the applicator sensed by a flow switch in the supply line to the pump. The selector valve assembly sequentially advantaged to the near additive tank in a preselected sequence in response to each closing of the applicator flow valve. This method had the advantage of the needing no electrical switches or other remote control external to the van, other than the applicator's on and off valve. This allowed the operator to control the choice of additives while applying the solutions. There was no need for the operator to return to the unit itself or to run wires and switches to the operator's position, or to use more sophisticated devices, such as radio remote control.

Unfortunately, while these advantages were achieved there was a disadvantage. The sensing of fluid flow was not usable with the entire range of fluid application rates necessary to handle different cleaning situations. In particular, a range of 2-5 gal./min. was proven to be too broad for reliable switching of the different cleaning additives.

A further problem with the units described in the aforementioned patents is that they were only suited to apply liquids at their initial temperature. Electrically heating the contents of the water storage tank beyond that necessary to maintain an initial temperature was not practical without external electrical power. In addition, the previous units employed an electrical generator system to provide power for the pumps and other accessories. This required not only a generator, but also electrical motors. Both the power available and the efficiency achievable are limited. In addition, 110 volt a.c. or higher voltage required more care, when used with a mobile unit in a wet environment, than low-voltage 12 volt direct current that is normally available in a vehicle.

SUMMARY OF INVENTION

The present invention is a new and improved washing and treating apparatus. The unit uses a pressure switch, rather than a flow switch, to detect the opening and closing of the applicator's on and off valve. The signal from the pressure switch is then used to sequentially cycle the selector valve assembly to the desired additive. In this way, simple operational control of the unit is achieved by the operator, even though separated from the unit itself by a long length of applicator hose. This allows the simple, reliable operation of the present invention without the difficulties of reliable additive switching found in the prior art when using a broad range of application rates (e.g. 2-5 gal./min.). The pressure switch may advantageously be integral with an unloader valve on the pump. In addition, a demand-type water heater is employed to optionally heat the sprayed fluids. This heater uses a sprayed fuel and forced air combustion system for maximum thermal efficiency. The fuel is ignited with a high voltage spark gap discharge powered by readily available low voltage d.c. current. Unlike the prior art inventions, this allows application of fluids at optimum temperature, even in cold weather. A single power source, preferably a diesel engine, is used to provide rotational power for the main pump, the rinse pump, the heater fuel pump and the heater blower. By avoiding multiple energy conversions, the use of a single power source improves overall system efficiency compared to the prior art.

One feature of the disclosed invention is to provide a simple and reliable means to select the different cleaning and treating additives used in the unit from the operator's remote location without remote electrical wiring or radio remote control.

Another feature of the disclosed invention is to optionally provide a pressure sensing switch integral with the main pump unloader valve.

Another feature of the disclosed invention is to provide cleaning and treating solutions at the optimum temperature for use.

Another feature of the disclosed invention is to provide a means to ignite the water heater fuel using only the readily available low voltage d.c. current used in the operation of the unit.

Another feature of the disclosed invention is to power the unit's rotational devices with a single internal combustion engine.

These and other aspects and advantages of the invention will be more fully understood from the following description in view of the accompanying drawings.

BRIEF DESCRIPTION OF THE DRAWINGS

FIG. 2 is a block diagram of the major components of the invention.

FIG. 3 is a block diagram of the main pump and unloader valve in combination with a pressure switch.

FIG. 4 is a block diagram of the water heater system.

DETAILED DESCRIPTION OF A PREFERRED EMBODIMENT

Figure 1:
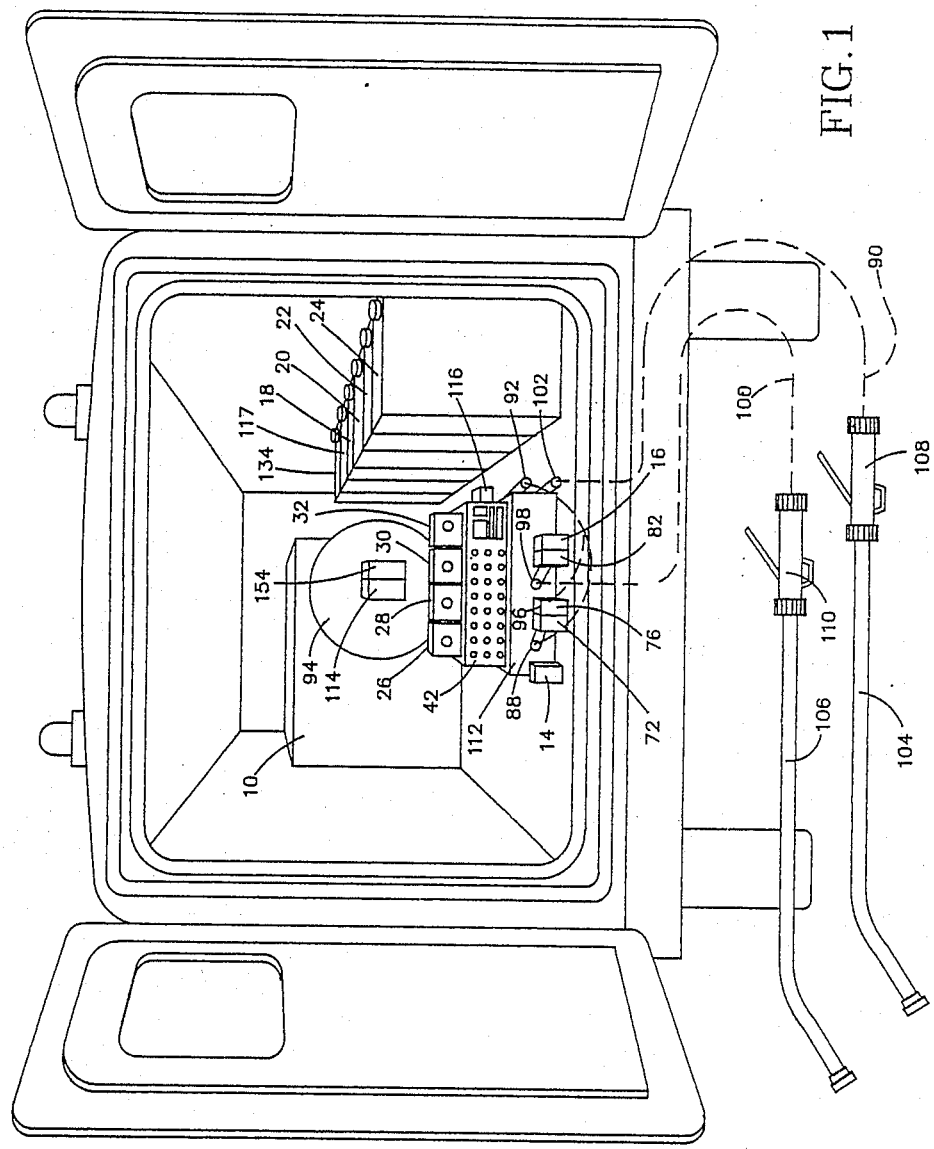
FIG. 1 is a perspective view of a van incorporating the present invention, illustrating the generally arrangement of the parts.

Referring to FIGS. 1 and 2, the water tank 10 communicates via conduit 12 with venturi injector 14 and rinse pump 16. Additive tanks 18, 20, 22, 24 communicate with selector valves 26, 28, 30, 32 via conduits 34, 36, 38, 40, respectively. The selector 42 is electrically connected to the solenoids 44, 46, 48, 50 by wires 52, 54, 56, 58, respectively. Solenoids 44, 46, 48, 50 are operatively connected to valves 26, 28, 30, 32, respectively, whereby energizing a solenoid opens the valve. Each of the valves 26, 28, 30, 32 communicates with the throat of venturi injector 14 via common conduit 60. By electrically energizing one of solenoids 44, 46, 48, 50, one of the additive tanks 18, 20, 22, 24 is fluidly connected to the injector 14. Knobs 62, 64, 66, 68 control the flow rate through valves 26, 28, 30, 32, respectively, when they are open. The selector 42 is also electrically connected to switch 70 (see FIG. 3) in the main unloader valve 72 via wires 74, 75. Injector 14 communicates with main pump 76 via conduit 78. Main pump 76 communicates with main unloader valve 72 via conduit 80. Rinse pump 16 communicates with rinse unloader valve 82 via conduit 84. The bypass outlet of rinse unloader valve 82 communicates with rinse pump 16 via conduit 84. The bypass outlet of main unloader valve 72 communicates with main pump 76 via conduit 86. The main unloader valve outlet 88 is fluidly connected either directly to applicator hose 90 (dashed lines) using quick connect hose connectors (not shown) or to the inlet 92 of water heater 94, via feed hose 96 using quick connect connectors. The rinse unloader valve outlet 98 may be fluidly connected to the applicator hose 100 using quick connect connectors or, if desired and the water heater inlet 92 is not connected to the main unloader valve outlet 88 by feed hose 96, to the heater inlet 92, using the feed hose 96 (dashed lines) with quick connect connectors. Applicator hoses 90, 100 may be connected to unloader valve outlets 88, 98 or water heater outlet 102 as desired. Spray applicators 104, 106 communicate with the free ends of applicator hoses 90, 100. Each applicator 104, 106 contains a valve 108, 110, respectively, that controls flow from the applicators.

The pump drive 112 is operably connected through the use of belts and pulleys (not shown) to drive the main pump 76, the rinse pump 16, the water heater blower 114 and the heater fuel pump 116. Fuel tank 117 supplies fuel for pump drive 12 via an unshown conduit.

Referring to FIG. 3, a block diagram of the main pump 76 and main unloader valve 72 is shown. The valve 72 comprises inlet 118, outlet 120, bypass outlet 122, spring means 124, valving member 126, valve seat 128 and linkage 129. The valving member 126 and valve seat 128 divide the valve 72 into a low pressure region 130 and a high pressure region 132. Member 126 moves toward the bypass outlet 122 in response to a fluid pressure differential between regions 130 and 132 greater than the preselected value as provided by spring means 124. This enables fluid to flow out the bypass outlet 122, thereby lowering the pressure differential between regions 130 and 132. In this manner the maximum output pressure may be regulated. Electrical switch 70 is mechanically connected to a valve member 126 by linkage 129, such that movement of member 126 closes switch 70 in the presence of a high pressure differential between regions 130 and 132 and opens switch 70 in the presence of a low pressure differential between regions 130 and 132. Switch 70 is electrically connected to selector 42 via wires 74, 75.

Referring to FIG. 4, a block diagram of the water heater system is shown. The fuel tank 134 communicates with check valve 136 via conduit 138. The check valve 136 communicates with fuel pump 116 via conduit 140. Fuel pump 116 communicates with bypass valve 142 via conduit 144. Shown in the straight-through position, bypass valve 142 allows communication between the pump 116 and burner 146 via conduit 148. In the bypass-position, bypass valve 142 allows communication between the input and output of pump 116 via conduit 150, thus recirculating the fuel rather than pumping it to the burner 146. Operation of the bypass valve 142 is by an electrical solenoid 152 electrically connected to heater control 154 via wires 156, 157. The bypass valve 142 is normally kept in the bypass position by spring 143. Liquid enters the heater coil 158 through the heater inlet 92 and exits through the outlet 102. A flow switch 160, located in-line with heater coil 158, indicates via wires 162, 163 to heater control 154 if there is liquid flow through the heater coil 158. A thermostat 164 touching or inserted into heater coil 158 near its outlet monitors the temperature of the liquid exiting coil 158 and is electrically connected to heater control 154 via wires 166, 167. The spark gap 168 is electrically connected to the heater control 154 via wires 170, 171 and is positioned in relation to the burner 146 so that a spark in the spark gap 168 will ignite the fuel sprayed from the burner 146.

Figure 5:
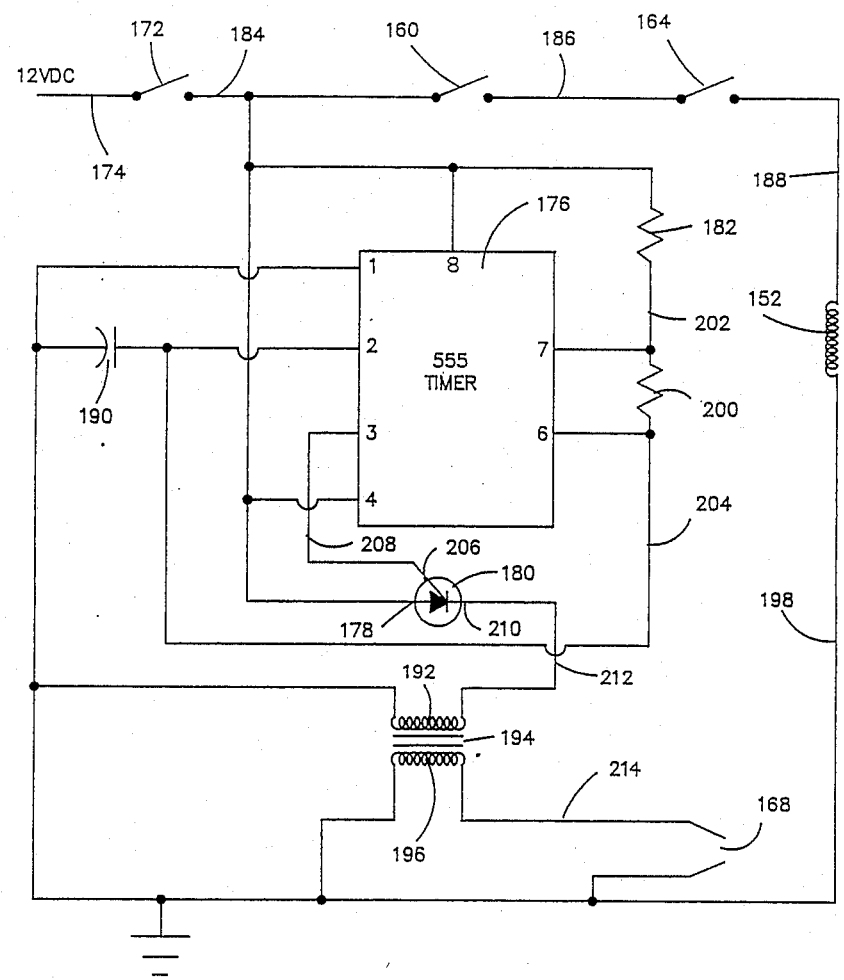
FIG. 5 is a schematic diagram of the water heater control and ignition circuit.

FIG. 5 is a schematic of the heater control 154. Switch 172 is connected by a first terminal to a low voltage d.c. source by conductor 174. The second terminal of switch 172 is electrically connected to a first terminal of flow switch 160, pins 4 and 8 of integrated circuit (IC) 176, preferably an Archer 555 timer, anode 178 of silicon controlled rectifier (SCR) 180, preferably an Archer 267-1067, and a first terminal of resistor 182 by conductor 184 (which includes wire 162). The second terminal of flow switch 160 is connected to a first terminal of thermostat 164 by conductor 186 (which includes wires 163 and 166). The second terminal of thermostat 164 is connected to a first terminal of bypass solenoid 152 by conductor 188 (which includes wires 167 and 156). The second terminal of bypass solenoid 152 is connected to a first terminal of capacitor 190, pin 1 of IC 176, a first terminal of primary winding 192 of transformer 194, a first terminal of secondary winding 196 of transformer 194, a first terminal of spark gap 168 and chassis ground by conductor 198 (which includes wires 157 and 171). The second terminal of resistor 182 is connected to a first terminal of resistor 200 and pin 7 of IC 176 by conductor 202. The second terminal of resistor 200 is connected to pins 6 and 2 of IC 176 and to the second terminal of capacitor 190 by conductor 204. Pin 3 of IC 176 is connected to gate 206 of SCR 180 by conductor 208. Cathode 210 of SCR 180 is connected to the second terminal of primary winding 192 by conductor 212. The second terminal of spark gap 168 is connected to the second terminal of secondary winding 196 by conductor 214 (which includes wire 170).

Low voltage d.c. current is applied to the circuit when heater switch 172 is closed. As will be recognized by one skilled in the art, integrated circuit 176, acting as an oscillator, will then produce a pulse train signal at the gate 206 of silicon controlled rectifier (SCR) 180. The gating of SCR 180 will result in a pulsating voltage across primary winding 192 o transformer 194. The turns ratio of transformer 194 is such that the secondary winding 196 will exhibit a voltage sufficient to arc across spark gap 168 (e.g., 60,000 volts). If flow switch 160 indicates that fluid is flowing in heater coil 158 and thermostat 164 is calling for hotter liquid, the fuel solenoid 152 will be energized, allowing fuel to flow to burner 146 through bypass valve 142. The arc across gap 168 will then ignite the fuel from burner 146.

To operate the unit, the pump drive 112 is set in operation, causing the main pump 76, the rinse pump 16, the heater fuel pump 116 and the heater blower 114 to operate by belts and pulleys. Unloader valves 72, 82 act to keep the fluid pressure at outlets 88, 98 constant, independent of fluid flow rates. Bypass valve 142 recirculates the pumped heater fuel unless heater control 154 calls for heat. If the on/off valve 108 of spray applicator 104 communicating with main pump 76 is put in the on position, fluid will flow from the main pump 76. This fluid will include water from tank 10 and, because of the venturi effect, the additive from one of the additive tanks 18, 20, 22, 24, if any, with which the injector 14 is communicating. The choice of the additive tank to communicate with injector 14 is determined by additive selection valves 26, 28, 30, 32 as controlled by the additive selector 42 by energizing solenoids 44, 46, 48, 50, respectively.

The additive selector 42 energizes the solenoids 44, 46, 48, 50 in a known repeating sequence to provide a corresponding sequence of cleaning or treating solutions. The next position in the sequence is triggered by the operator moving the on/off valve 108 to the off position (or optionally to the on position). This causes the pressure in the main unloader valve 72 to go to its maximum value, giving maximum bypass and closing switch 70. In response to switch 70, selector 42 advances to the next position in the sequence. Unlike flow switches, which are of necessity sensitive to flow rates, switch 70 always operates at maximum pressure (maximum bypass), thereby giving extremely reliable operation. Upon opening valve 108, the injector 14, now communicating with a new additive tank, provides a new solution to the spray applicator 104. The sequence of different additives repeats as the on/off valve 108 is cycled on and off.

Use of the spray applicator 106 communicating with the rinse pump 16 is much the same as for applicator 104 communicating with main pump 76, except the contents of tank 10 are sprayed without additional additives.

The water heater 94 may be inserted between either conduit 78 and the spray applicator 104 or conduit 12 and spray applicator 106. Using quickconnect hose couplings, it is necessary only to connect the desired one of unloader outlets 88, 98 to the heater inlet 92 with the feeder hose 96; and to connect the heater outlet 102 to one of the applicator hoses 90, 100 with a spray applicator 104, 106, respectively, on the other end. Many cleaning or treating additives work much better when heated. Also, heated sprays allow operation in much colder weather.

Using a demand-type water heater is energyefficient. Only when the flow switch 160 indicates fluid flow and the thermostat 164 indicates the need for a higher temperature output will the water heater 94 operate. When heater control 154 energizes the solenoid 152, bypass valve 142 changes from recirculating to supplying burner 146 with fuel. The fuel and air from blower 114 are then ignited by a high voltage arc developed across spark gap 168. The high voltage, low current signal for the spark gap is developed by the heater control 154 from the easy to manage and readily available low voltage d.c. current available from either the vehicle electrical system or the pump drive 112 electrical system (not shown).

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A washing and treating unit comprising a water source; a plurality of liquid additive tanks; a water and additive mixing means connected to the water source; an additive selection means, wherein said selection means communicates sequentially with the additive tanks in a known repeating sequence, said selection means also communicating with the mixing means; a main pump communicating with the mixing means, whereby liquid is drawn from the water source and one of said additive tanks; a main pump unloader pressure-sensitive valve communicating with the main pump output, said valve causing the output of the main pump to recirculate to the main pump input when the output pressure of the main pump exceeds a known value; a spraying means communicating with the unloader valve, whereby liquid under pressure from the main pump may be sprayed; and a pressure sensing means operably connected to the unloader valve and the selection means, said pressure sensing means being an integral portion of said unloader valve, whereby a pressure change in the output of the main pump causes the selection means to advance to the next position in the sequence.

2. A device according to claim 1, additionally comprising a rinse pumping means connected between the water source and an additional spraying means, whereby rinse water under pressure from the rinse pumping means may be sprayed.

3. A device according to claim 2, wherein the main pumping means and the rinse pumping means share a single driving means which is operatively connected thereto.

4. A device according to claim 1, wherein said main pumping means comprises an internal combustion engine as the sole driving means for the washing and treating unit.

5. A device according to claim 1, wherein the valve, acting as the pressure sensing means, is operatively connected to an electrical switch, said switch switching an electrical signal operating to advance the selection means to the next position in the sequence.

6. A washing and treating unit comprising a water source; a plurality of liquid additive tanks; a water and additive mixing means connected to the water source; an additive selection means, wherein said selection means communicates sequentially with the additive tanks in a known repeating sequence, said selection means also communicating with the mixing means; a main pumping means communicating with the mixing means, whereby liquid is drawn from the water source and one of said additive tanks; a spraying means communicating with the main pumping means, whereby liquid under pressure from the main pumping means may be sprayed; and a liquid heating means insertable between the main pumping means and the spraying means, said heating means comprising a heating fuel ignition means having an electrical oscillator powered by low voltage direct current, a step-up transformer operably connected to the output of the oscillator, and a spark gap means operably connected to the output of the transformer, whereby a high voltage spark is supplied to ignite heating fuel.

7. A device according to claim 2, additionally comprising a rinse pumping means connected between the water source and an additional spraying means, said heating means being insertable between the water source and the additional spraying means.

8. A device according to claim 6, wherein the heating means further comprises a combustion air blower means.

9. A device according to claim 8, wherein the blower means and the main pumping means share a single driving means which is operatively connected thereto.

10. A device according to claim 6, wherein said main pumping means comprises an internal combustion engine as a driving means.

11. A device according to claim 6, wherein the heating means further comprises a fuel pumping means.

12. A device according to claim 7, wherein the fuel pumping means and the main pumping means share a single driving means which is operatively connected thereto.

13. A mobile cleaning and treating unit contained in a self-propelled vehicle comprising a water source; a plurality of liquid additive tanks; a water and additive mixing means connected to the water source; an additive selection means, wherein said selection means comunicates sequentially with the additive tanks in a known repeating sequence, said selection means also communicating with the mixing means; a main pumping means communicating with the mixing means, whereby liquid is drawn from the water source and one of said additive tanks; a spraying means communicating with the main pumping means, whereby liquid under pressure from the main pumping means may be sprayed; a pressure sensing means operably connected to the output of the main pumping means and the selection means, whereby a pressure change in the output of the main pumping means causes the selection means to advance to the next position in the sequence; and a liquid heating means insertable between the main pumping means and the spraying means, said heating means comprising a heating fuel ignition means, wherein said ignition means is powered by low voltage direct current, the ignition means having an electrical oscillator powered by low voltage direct current, a step-up transformer operably connected to the output of the oscillator, and a spark gap means operably connected to the output of the transformer whereby a high voltage spark is supplied to ignite heating fuel.

14. A device according to claim 13, additionally comprising a rinse pumping means connected between the water source and an additional spraying means, whereby rinse water under pressure from the rinse pumping means may be sprayed, wherein said heating means is operably insertable between the rinse pumping means and the additional spraying means.

15. A device according to claim 13, wherein said main pumping means comprises a pump and a pump unloader valve, said valve comprising a movable member, the member moving to cause the output of the pump to recirculate to the pump input when the output pressure of the pump exceeds a known value, the movable member being operably linked to an electrical switch, said switch switching an electrical signal operating to advance the selection means to the next position in the sequence, the valve thereby embodying the pressure sensing means.

16. A device according to claim 14, wherein the heating means further comprises a combustion air blower means and a fuel pumping means, wherein the fuel pumping means, the main pumping means, the rinse pumping means and the air blower means share a single driving means which is operatively connected thereto.

17. A device according to claim 16, wherein said driving means comprises an internal combustion engine.

18. A washing and treating unit comprising a water source; a plurality of liquid additive tanks; a water and additive mixing means connected to the water source; an additive selection means, wherein said selection means communicates sequentially with the additive tanks in a known repeating sequence, said selection means also communicating with the mixing means; a main pump communicating with the mixing means, whereby liquid is drawn from the water source and one of said additive tanks; a main pump unloader valve communicating with the main pump output, said valve causing the output of the main pump to recirculate to the main pump input when the output pressure of the main pump exceeds a known value; a spraying means communicating with the unloader valve, whereby liquid under pressure from the main pump may be sprayed; a pressure sensing means operably connected to the unloader valve and the selection means, said pressure sensing means being an integral portion of said unloader valve, wherein a pressure change in the output of the main pump causes the selection means to advance to the next position in the sequence; a rinse pump connected between the water source and an additional spraying means, whereby rinse water under pressure from the rinse pump may be sprayed; and a liquid heating means insertable between the water source and the spraying means, said heating means comprising a combustion air blower, a fuel pump, and a heating fuel ignition means having an electrical oscillator powered by low voltage direct current, a step-up transformer operably connected to the output of the oscillator, and a spark gap means operably connected to the output of the transformer, whereby a high voltage spark is supplied to ignite heating fuel, wherein said main pump, rinse pump, blower, and fuel pump share a single driving means which is operably connected thereto.

* * * * *